(No Model.)

W. T. GRANT.
SUSPENSION HINGE GATE.

No. 435,646. Patented Sept. 2, 1890.

Witnesses:
Thos. Houghton.
J. S. Tomlinson.

Inventor:
William Thomas Grant
By his Atty.
Wm. R. Singleton.

UNITED STATES PATENT OFFICE.

WILLIAM THOMAS GRANT, OF JACKSONVILLE, ILLINOIS.

SUSPENSION-HINGE GATE.

SPECIFICATION forming part of Letters Patent No. 435,646, dated September 2, 1890.

Application filed May 11, 1888. Renewed July 2, 1890. Serial No. 357,473. (No model.)

*To all whom it may concern:*

Be it known that I, WILLIAM THOMAS GRANT, a citizen of the United States, residing at Jacksonville, in the county of Morgan and State of Illinois, have invented certain new and useful Improvements in Farm Suspension-Hinge Gates; and I do hereby declare the following to be a full, clear, and exact description of the invention, such as will enable others skilled in the art to which it appertains to make and use the same.

This invention relates to certain improvements in farm-gates, which will be hereinafter more particularly described, and pointed out in the claim.

Figure 1:
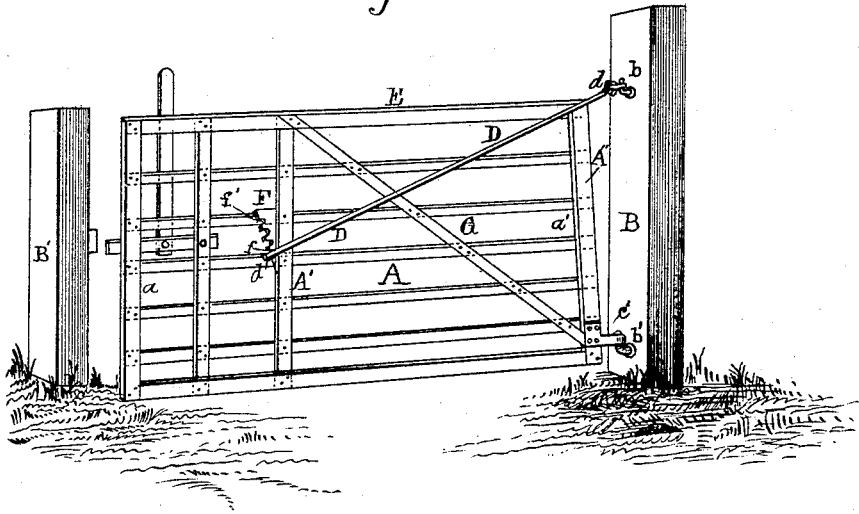
Figure 2:
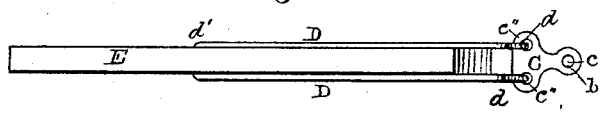

In the accompanying drawings, forming part of this specification, Figure 1 is a perspective view of a gate with my improvements attached. Fig. 2 is a top view of the gate, showing the hinge.

A is a gate, which may be of any ordinary construction.

In the drawings five bars are shown between the top and bottom rails.

B is the hanging-post and B' the latch-post.

In the hanging-post B there is an upper male hinge or hook $b$ and a lower one $b'$. The weight of the gate is mainly sustained by the lower hook $b'$, on which the lower hinge $c'$ is made to turn. On the upper hook $b$ is hung a hinge-piece C, as shown in Fig. 2, having three eyes $c$ and $c''$ $c''$. The eye $c$ goes over the hook $b$, and the eyes $c''$ $c''$ engage loops or hooks $d\ d$ at the ends of an iron rod D, bent at its middle into a loop or yoke $d'$, which passes through the gate A in front of a stile A', forming part of the gate-frame. In front of this stile A' is a notched wedge F, the loop or yoke $d'$ resting in one of the notches.

When the gate is properly constructed, the rod D is made just long enough, when it rests in one of the lower notches $f$ of wedge F, to let the gate down to its lowest gage. Thus when the wedge F is adjusted so that the loop $d'$ will rest in the highest notch $f'$ the front of the gate will be somewhat elevated to permit very small stock animals to pass under it. The hanging stile A", it will be noticed, is not vertical, but inclines inwardly. This is so constructed in order that when the front is elevated the top of the stile A" may not interfere with the gate-post B. The cap-piece E is of the same width with the stiles, and the rod D fits snugly against the frame of the gate to support it on each side to prevent its twisting.

The ordinary fastenings can be used to secure the gate when closed, as shown in Fig. 1.

The gate-frame is stiffened by the brace G in the usual manner.

This improved suspension-hinge can be applied to any ordinary gate now in use.

In some cases the wedge F may be used without notches, and in a double-frame gate two wedges would be required—viz., one before each middle stile.

I claim—

The combination, with a gate and its hinge-post, of the bent rod D, having the hooks $d\ d$ on its ends, the plate C, with three eyes, the wedge F, the male hinge $b$, and the lower hinge $b'$ $c'$, as and for the purpose described.

In testimony whereof I affix my signature in presence of two witnesses.

WILLIAM THOMAS GRANT.

Witnesses:
ETHELBERT D. ROTHWELL,
EDWARD SCOTT.